US012190454B2

(12) United States Patent
Esnault et al.

(10) Patent No.: US 12,190,454 B2
(45) Date of Patent: Jan. 7, 2025

(54) SYSTEM AND METHOD FOR PROVIDING VISUAL ASSISTANCE TO AN INDIVIDUAL SUFFERING FROM MOTION SICKNESS (71) Applicant: Orange, Issu-les-Moulineaux (FR)

(72) Inventors: Régis Esnault, Chatillon (FR); Jean Cartigny, Chatillon (FR); Christian Gregoire, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 332 days.

(21) Appl. No.: 17/785,146

(22) PCT Filed: Dec. 14, 2020

(86) PCT No.: PCT/FR2020/052413
§ 371 (c)(1),
(2) Date: Jun. 14, 2022

(87) PCT Pub. No.: WO2021/123584
PCT Pub. Date: Jun. 24, 2021

(65) Prior Publication Data
US 2023/0015904 A1 Jan. 19, 2023

(30) Foreign Application Priority Data
Dec. 16, 2019 (FR) ...................... 1914547

(51) Int. Cl.
*G06T 19/00* (2011.01)
*G01C 19/00* (2013.01)
(Continued)

(52) U.S. Cl.
CPC ............ *G06T 19/006* (2013.01); *G01C 19/00* (2013.01); *G01C 21/3407* (2013.01);
(Continued)

(58) Field of Classification Search
CPC ......... G06T 19/006; G06T 7/70; G06T 19/20; G06T 2207/30268; G01C 19/00;
(Continued)

(56) References Cited

U.S. PATENT DOCUMENTS

| 5,966,680 A | * | 10/1999 | Butnaru | ............... G02B 27/017 |
| | | | | 702/150 |
| 8,708,884 B1 | * | 4/2014 | Smyth | ................... A61M 21/00 |
| | | | | 706/15 |

(Continued)

FOREIGN PATENT DOCUMENTS

| DE | 102014112077 A1 | 2/2016 |
| DE | 102014019579 A1 | 6/2016 |

(Continued)

OTHER PUBLICATIONS

English Translation of the Written Opinion of the International Searching Authority dated Mar. 16, 2021 for corresponding International Application No. PCT/FR2020/052413, filed Dec. 14, 2020.
(Continued)

*Primary Examiner* — Michael S Osinski
(74) *Attorney, Agent, or Firm* — David D. Brush; Westman, Champlin & Koehler, P.A.

(57) ABSTRACT

A system and a method for providing visual assistance to an individual suffering from motion sickness. The system includes: a sensor configured to measure movement data of a vehicle in real time; an artificial horizon device designed to generate an image of an artificial horizon in real time on the basis of the movement data of the vehicle; and a wearable augmented reality device designed to display the image of the artificial horizon in real time to an individual who is wearing the wearable device and is a passenger in the vehicle.

19 Claims, 5 Drawing Sheets (51) Int. Cl.
*G01C 21/34* (2006.01)
*G01P 15/18* (2013.01)
*G02B 27/01* (2006.01)
*G06T 7/70* (2017.01)
*G06T 19/20* (2011.01)
*G06V 40/20* (2022.01)

(52) U.S. Cl.
CPC .......... *G01P 15/18* (2013.01); *G02B 27/0172* (2013.01); *G06T 7/70* (2017.01); *G06T 19/20* (2013.01); *G06V 40/20* (2022.01); *G06T 2207/30268* (2013.01)

(58) Field of Classification Search
CPC . G01C 21/3407; G01P 15/18; G02B 27/0172; G02B 27/017; G02B 2027/014; G02B 2027/0187; G02B 2027/0138; G02B 2027/0178; G02B 2027/0183; G02B 2027/0141; G02B 27/0093; G02B 27/0179; G06V 40/20; B60K 35/656; B60K 35/00; B60W 2540/221; B60W 2540/223; B60W 2552/30; B60W 2556/10; B60W 2556/50; G06F 3/011; G06F 3/14; G06F 3/012; A61M 21/00; A61M 2021/0044; A61M 2021/005; A61M 2205/332; A61M 2230/63; A61M 2021/0022; A61M 21/02; A61M 2205/502; A61M 2205/507; A61M 2230/04; A61M 2230/62; A61M 2230/60; A61M 2230/10

See application file for complete search history.

(56) References Cited

U.S. PATENT DOCUMENTS

| | | | | |
|---|---|---|---|---|
| 9,542,147 | B2* | 1/2017 | Colby | B64D 43/00 |
| 9,862,312 | B2* | 1/2018 | Sivak | B60Q 3/66 |
| 10,455,165 | B2* | 10/2019 | Goldstein | G06F 3/04817 |
| 10,775,634 | B2* | 9/2020 | Tümler | G02B 27/0179 |
| 11,207,952 | B1* | 12/2021 | Bonilla Acevedo | B60J 1/20 |
| 11,260,750 | B2 | 3/2022 | Kühne et al. | |
| 11,364,867 | B2* | 6/2022 | Kuehne | B60R 21/015 |
| 2006/0080004 | A1* | 4/2006 | Cheok | G01C 15/14 |
| | | | | 701/1 |
| 2015/0097861 | A1* | 4/2015 | Alaniz | G06T 11/60 |
| | | | | 345/633 |
| 2015/0234186 | A1* | 8/2015 | Meadows | B60K 35/00 |
| | | | | 345/8 |
| 2015/0294505 | A1* | 10/2015 | Atsmon | G06F 3/04815 |
| | | | | 345/633 |
| 2016/0048027 | A1* | 2/2016 | Shpigelman | G06T 15/00 |
| | | | | 345/156 |
| 2016/0167672 | A1* | 6/2016 | Krueger | G16H 40/63 |
| | | | | 340/576 |
| 2018/0184014 | A1* | 6/2018 | Goldstein | G06V 20/56 |
| 2018/0365804 | A1* | 12/2018 | Rikoski | G09G 5/003 |
| 2019/0076618 | A1* | 3/2019 | Fainstain | A61M 21/00 |
| 2019/0083739 | A1 | 3/2019 | Jeannin | |
| 2019/0182435 | A1* | 6/2019 | Nakayama | B60K 35/00 |
| 2021/0023984 | A1 | 1/2021 | Kühne | |
| 2021/0224010 | A1* | 7/2021 | Kuehne | G06F 3/011 |
| 2021/0237747 | A1* | 8/2021 | Schmidt | B60W 50/0098 |
| 2021/0318539 | A1* | 10/2021 | Profendiner | G02B 27/017 |
| 2023/0007953 | A1* | 1/2023 | Cazes | B60K 35/28 |
| 2023/0013174 | A1* | 1/2023 | Bollier | B60K 35/658 |

FOREIGN PATENT DOCUMENTS

| | | | | |
|---|---|---|---|---|
| DE | 102017207788 | A1 | 11/2018 | |
| DE | 102017208881 | A1 | 11/2018 | |
| EP | 3869302 | A1 * | 8/2021 | ............... G06F 3/01 |
| KR | 20180025540 | A | 3/2018 | |

OTHER PUBLICATIONS

International Search Report dated Mar. 16, 2021 for corresponding International Application No. PCT/FR2020/052413, Dec. 14, 2020.
Written Opinion of the International Searching Authority dated Mar. 16, 2021 for corresponding International Application No. PCT/FR2020/052413, filed Dec. 14, 2020.

* cited by examiner

FIG. 4C

SYSTEM AND METHOD FOR PROVIDING VISUAL ASSISTANCE TO AN INDIVIDUAL SUFFERING FROM MOTION SICKNESS

CROSS-REFERENCE TO RELATED APPLICATIONS

This application is a Section 371 National Stage Application of International Application No. PCT/FR2020/052413, filed Dec. 14, 2020, the content of which is incorporated herein by reference in its entirety, and published as WO 2021/123584 on Jun. 24, 2021, not in English.

FIELD OF THE DISCLOSURE

The field of the invention relates to providing visual assistance to an individual suffering from travel sickness, also known as "motion sickness".

The system and method for providing visual assistance of the present invention are intended in particular for an individual who is a passenger in a vehicle, when his/her visual attention is focused on an element that is unmoving within the frame of reference of the vehicle, for example the screen of his/her phone or of his/her digital tablet for example.

BACKGROUND

It is currently estimated that almost one in three people suffer from travel sickness, more commonly known as "motion sickness".

Motion sickness results in a set of symptoms that occur when the person suffering from this ailment is traveling in a vehicle, whether by car, train, aircraft, or boat. These symptoms may be, for example, a feeling of discomfort, nausea, dizziness, fatigue, or headaches.

Motion sickness is caused by conflicting sensory information. In particular, motion sickness is caused by a maladaptive response of the brain to the reception of visual information and of information provided by the inner ear during a trip in a vehicle.

Indeed, when the individual's attention is focused on an unmoving visual element within the vehicle's frame of reference, typically the screen of a telephone or of a digital tablet, the eyes do not perceive movement since this visual element is unmoving relative to the individual. However, if the movements of the vehicle intensify, the inner ear can perceive the movement and transmit opposing information to the brain.

Currently, there are existing drug treatments available which allow alleviating the symptoms associated with motion sickness. It is also known that repeated travel can reduce motion sickness over the long term.

SUMMARY OF DISCLOSURE

The invention improves the situation.

In this capacity, the invention relates to a system for providing visual assistance to an individual suffering from motion sickness. The system comprises:
- a sensor configured for measuring movement data of a vehicle in real time within a three-dimensional terrestrial frame of reference,
- an artificial horizon device suitable for generating an image of an artificial horizon in real time on the basis of the movement data of the vehicle, and
- a wearable augmented reality device suitable for displaying the artificial horizon image in real time to an individual who is wearing the wearable device and is a passenger of the vehicle.

Thus, even when the visual attention of the individual wearing the wearable device is focused on an object or element that is unmoving within the vehicle's frame of reference, the artificial horizon image displayed by the wearable augmented reality device visually informs the individual of vehicle movements. The visual movement information is then consistent with the information transmitted by the inner ear to the brain, so that the effects of motion sickness are reduced.

The wearable augmented reality device comprises, for example, augmented reality glasses or an augmented reality helmet.

In one or more embodiments, the artificial horizon device is suitable for generating the artificial horizon image also on the basis of a category of the vehicle. The artificial horizon device can thus be configured for one or more of the following categories of vehicles: automobile, train, aircraft, and boat.

Indeed, depending on the category of vehicle, the artificial horizon device can adopt an appropriate weighting of the different movements. The movements are of different types in the various vehicles. Typically, an aircraft and a boat are mainly subject to rotations about the lateral axis, i.e. pitch, and about the longitudinal axis, i.e. roll. In contrast, an automobile is more likely to execute rotations about its vertical axis.

In one or more embodiments, the artificial horizon device is suitable for generating the artificial horizon image also on the basis of data relating to the individual, comprising one or more of the following items of information: age, morphology, visual abilities, and degree of susceptibility to motion sickness.

In one or more embodiments, the sensor is further configured for collecting geolocation data of the vehicle, and the artificial horizon device or the sensor is further suitable for predicting vehicle movement data, based on geolocation data of the vehicle.

In one or more embodiments, the system comprises a database configured for storing one or more routes of the vehicle. Each route is associated, within the database, with one or more artificial horizon images.

Advantageously, the sensor is further configured for collecting geolocation data of the vehicle and the artificial horizon device is further suitable for determining, on the basis of the movement data and geolocation data of the vehicle, a current route of the vehicle and comparing the current route with the route(s) stored in the database, the artificial horizon device being further suitable for:
- if the current route is already stored in the database, generating the artificial horizon image on the basis of the artificial horizon image(s) associated with the current route within the database,
- otherwise, storing in the database the current route and the artificial horizon image(s) generated on the current route.

In general, the use of geolocation for anticipating the route followed by the vehicle and therefore its future movements allows rapid predictive generation of the artificial horizon image, which limits the lag between the artificial horizon as it is displayed to the individual via the artificial horizon image and the relative actual position of the vehicle, and therefore of the individual, with respect to the actual horizon.

In one or more embodiments, the sensor comprises:
at least one accelerometer configured for measuring data relating to an acceleration of the vehicle within the three-dimensional terrestrial frame of reference, and
at least one gyroscope configured for measuring data relating to an angular velocity of the vehicle within the three-dimensional terrestrial reference.

The movement data of the vehicle then includes data relating to the acceleration and angular velocity of the vehicle.

In one or more embodiments, the sensor or the artificial horizon device is further suitable for determining, on the basis of the movement data of the vehicle, a rotation of the vehicle, the artificial horizon device being further suitable for generating the artificial horizon image also on the basis of the rotation of the vehicle.

In one or more embodiments, the sensor or the artificial horizon device is further suitable for determining, on the basis of the movement data of the vehicle, an attitude of the vehicle, the artificial horizon device being further suitable for generating the artificial horizon image also on the basis of the attitude of the vehicle.

In one or more embodiments, the artificial horizon image comprises an artificial horizon line.

In one or more embodiments, the wearable augmented reality device is further suitable for measuring data on the movement of the individual's head within a three-dimensional frame of reference of the vehicle, the artificial horizon device being suitable for generating the artificial horizon image also on the basis of the data on the movement of the individual's head.

In one or more embodiments, the wearable augmented reality device is further suitable for measuring data on the position of the individual's head relative to a screen, the artificial horizon device being suitable for generating the artificial horizon image also on the basis of the data on the position of the individual's head relative to the screen and, possibly, on the basis of data relating to the screen.

For example, the data relating to the screen comprise data relating to dimensions of the screen and/or data relating to a multimedia content displayed by the screen.

Advantageously, the wearable augmented reality device is further suitable for detecting the presence of the screen within the individual's field of vision.

As explained above, the system that is the object of the invention is particularly useful in a context where the individual wearing the wearable device does not have visual information about the movement of the vehicle. Very often, the visual attention of the individual is focused on a screen, for example of a phone or digital tablet. It may therefore be of interest to exploit the presence of the screen within the visual field of the individual, to display the artificial horizon image.

Advantageously, when the screen is detected within the individual's field of vision, the artificial horizon device is further suitable for generating an artificial horizon image comprising a pattern representative of the artificial horizon and that can be superimposed on a portion of an edge of the screen, the wearable augmented reality device being suitable for superimposing the pattern onto a real image of the portion of the edge of the screen.

Advantageously, the artificial horizon device is further suitable for, when the screen is detected within the individual's field of vision, generating an artificial horizon image comprising a pattern that can be superimposed on a portion of the screen in the form of tiling distorted according to the artificial horizon, the wearable augmented reality device being suitable for superimposing the pattern onto a real image of the portion of the screen.

Furthermore, the invention also relates to a method, implemented by computer means, for providing visual assistance to an individual suffering from motion sickness, comprising:
measurement by a sensor, in real time, of the movement data of a vehicle within a three-dimensional terrestrial frame of reference,
generation in real time of an artificial horizon image by an artificial horizon device on the basis of the movement data of the vehicle, and
display of the artificial horizon image in real time, via a wearable augmented reality device, to an individual who is wearing the wearable device and is a passenger of the vehicle.

Finally, the invention also relates to a computer program comprising instructions for implementing the method described above when the instructions are executed by at least one processor.

BRIEF DESCRIPTION OF THE DRAWINGS

Other features, details and advantages will become apparent upon reading the detailed description below, and upon analyzing the appended drawings, in which.

DETAILED DESCRIPTION OF ILLUSTRATIVE EMBODIMENTS

Figure 1:
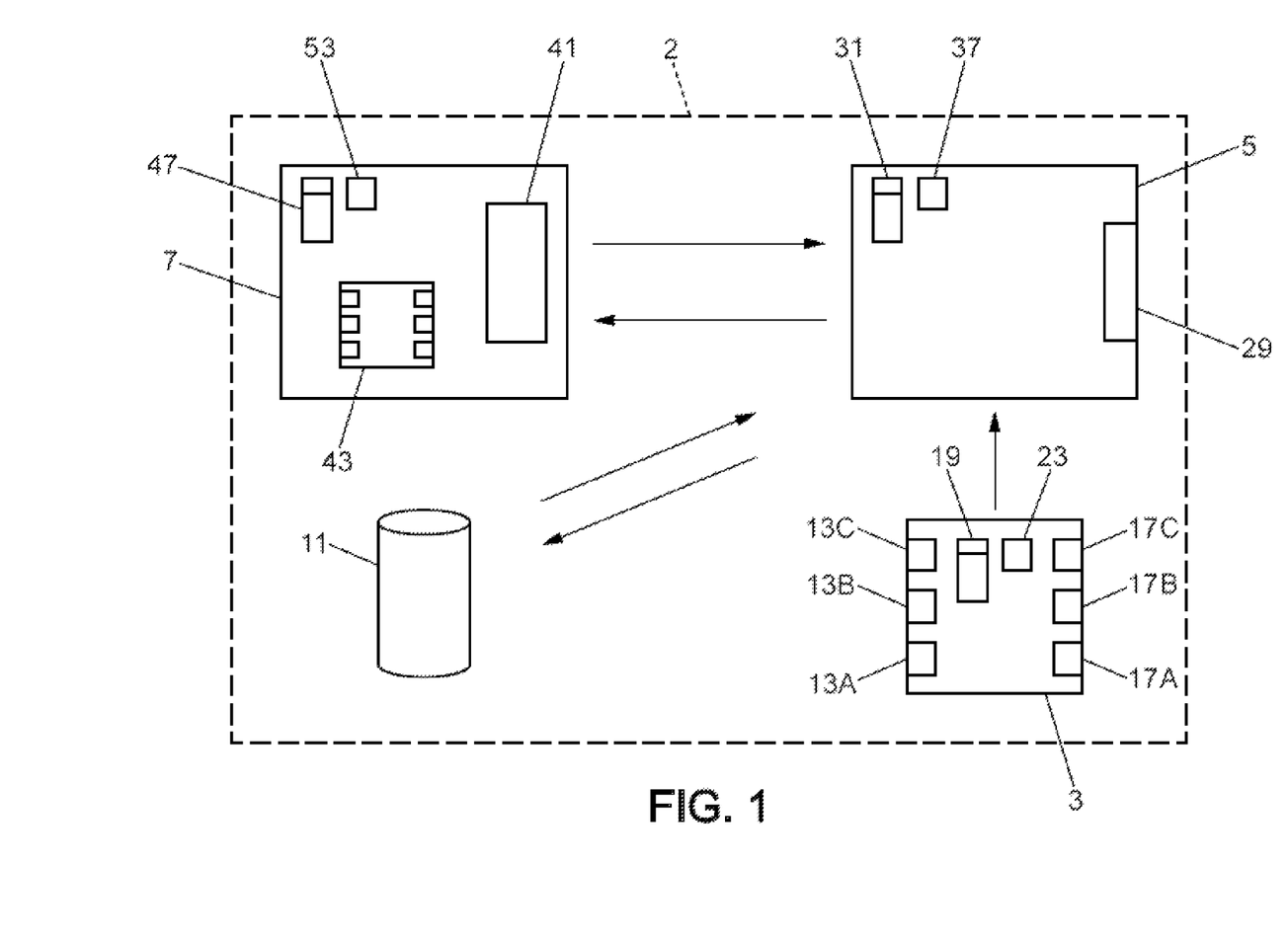
FIG. 1 schematically illustrates a system for providing visual assistance to an individual suffering from motion sickness, according to the invention.

FIG. 1 schematically illustrates a system for providing visual assistance, hereinafter the system 2, to an individual suffering from motion sickness.

Travel sickness, more commonly known as "motion sickness", can manifest in an individual, during a trip in a vehicle, in the form of various symptoms such as a feeling of discomfort, nausea, dizziness, fatigue, or headaches.

Motion sickness is caused by a contradiction between the visual information and the information provided by the inner ear during the trip. In particular, when the visual attention of the individual is focused on an element that is unmoving within the frame of reference of the vehicle, and therefore unmoving for the individual, the eyes do not perceive movement while movement is perceived by the inner ear, and more precisely by the vestibule.

The system 2 is suitable for providing the individual with visual information consistent with the movement information collected by the inner ear. More specifically, the system 2 is suitable for generating an artificial horizon image on the basis of movement data of the vehicle in which the individual is located, then displaying the artificial horizon image in augmented reality to the individual in question. Thus, even when the visual attention of the individual is focused on an element that is unmoving within the frame of reference of the vehicle, the artificial horizon image displayed in real time gives visual movement information that is consistent with what the inner ear perceives.

The system 2 comprises a sensor 3, an artificial horizon device 5, and a wearable augmented reality device 7. Advantageously, the system 2 also comprises a database 11.

In FIG. 1, the artificial horizon device 5 and the wearable augmented reality device 7 are two distinct entities. It is understood here, however, that the artificial horizon device 5 and the wearable augmented reality device 7 may be one and the same device.

The sensor 3 is configured for measuring vehicle movement data in real time within a three-dimensional terrestrial frame of reference.

For example, the movement data measured by the sensor 3 relate to an acceleration of the vehicle in one or more directions, or axes, of the three-dimensional terrestrial frame of reference. The movement data may also relate to an angular velocity of the vehicle in one or more directions, or axes, of the three-dimensional terrestrial frame of reference.

The sensor 3 may also be configured for collecting other data, such as a geolocation of the vehicle corresponding to a current position of the vehicle. This position may be determined automatically by a server connected to a network to which the sensor 3 is connected.

Of course, the sensor 3 may also comprise a geolocation module, not shown here, for calculating geolocation data for the vehicle.

As illustrated in FIG. 1, the sensor 3 comprises at least one accelerometer, here three accelerometers 13A, 13B, and 13C, at least one gyroscope, here three gyroscopes 17A, 17B, and 17C, a memory 19, and a processor 23.

The accelerometer is configured for measuring data relating to an acceleration of the vehicle within the three-dimensional terrestrial frame of reference.

Because the vehicle can move within a three-dimensional space, it is advantageous to measure the acceleration of the vehicle in each of the three directions of the three-dimensional terrestrial frame of reference. Thus, accelerometer 13A measures data relating to the acceleration of the vehicle in a first direction, or along a first axis, accelerometer 13B measures data relating to the acceleration of the vehicle in a second direction, or along a second axis, and accelerometer 13C measures data relating to the acceleration of the vehicle in a third direction, or along a third axis.

Here, three accelerometers 13A, 13B and 13C have been illustrated. However, it is understood that a single accelerometer can measure the acceleration of the vehicle in each of the three directions.

The gyroscope is configured for measuring data relating to an angular velocity of the vehicle within the three-dimensional terrestrial frame of reference.

As with acceleration, it is advantageous to measure the angular velocity of the vehicle in each of the three directions of the three-dimensional terrestrial frame of reference. Thus, gyroscope 17A measures data relating to the angular velocity of the vehicle in the first direction, or around the first axis, gyroscope 17B measures data relating to the angular velocity of the vehicle in the second direction, or around the second axis, and gyroscope 17C measures data relating to the angular velocity of the vehicle in the third direction, or around the third axis.

Here, three gyroscopes 17A, 17B, and 17C have been illustrated. However, it is understood that a single gyroscope can measure the angular velocity of the vehicle in each of the three directions.

The memory 19 is configured for storing instructions of a computer program whose execution by the processor 23 results in the operation of the sensor 3.

The memory 19 may also store the measurements made by the sensor 3 in real time.

The processor 23 may be configured for determining a rotation of the vehicle, on the basis of the vehicle movement data.

More precisely, the processor 23 can determine a vehicle attitude. For an aircraft, the longitudinal attitude in particular is determined, which designates the position of the longitudinal axis of the aircraft relative to the horizontal plane. For a boat, it is rather the horizontal attitude that is determined, also called list, to designate the position of the lateral axis of the boat relative to the horizontal plane.

The artificial horizon device 5 is suitable for generating an artificial horizon image in real time on the basis of the movement data of the vehicle.

It is understood that the artificial horizon device 5 is suitable for receiving the movement data measured in real time by the sensor 3, and for generating an artificial horizon image on the basis of these movement data.

The artificial horizon image is intended to be displayed to an individual in order to give the individual real-time visual information about the movement of the vehicle via the movement of the artificial horizon displayed. Artificial horizon images are generated in real time to provide visual information to the individual about movements of the vehicle relative to the actual horizon.

As explained above, geolocation data of the vehicle may be determined by the sensor 3. In such an embodiment, the artificial horizon device 5 may be further configured so that it itself determines movement data of the vehicle on the basis of its geolocation. Indeed, the geolocation data can be used to determine a route followed by the vehicle and in this case to anticipate the movement of the vehicle, in particular directional changes.

Of course, the sensor 3 itself may also determine the movement data of the vehicle on the basis of geolocation data, according to the same principle of determining the route followed by the vehicle and anticipating upcoming movements.

Such an embodiment is applicable in particular to the case where the vehicle in question is an automobile whose movements are constrained in principle by the curves of the road followed by the automobile.

As shown in FIG. 1, the artificial horizon device 5 comprises a configuration interface 29, a memory 31, and a processor 37.

The configuration interface 29 is suitable for configuring the artificial horizon device 5.

Indeed, in addition to the movement data of the vehicle, other information and data may be used to generate the artificial horizon image.

For example, the artificial horizon device 5 is suitable for generating the artificial horizon image on the basis of a category of the vehicle as well. The artificial horizon device 5 can thus be configured for one or more of the following categories of vehicles: automobile, train, aircraft, and boat.

Indeed, the nature of the movements can be very different from one category of vehicle to another.

Thus, while an aircraft and a boat may be subject to rotations of large amplitude about the lateral axis (the term pitch is then used) and about the longitudinal axis (the term roll is then used), an automobile and a train will be subject to rotations of lower amplitude about these axes. Conversely, a car is generally subject to movements of large amplitude about the vertical axis, and the term yaw is then used, which is less the case for an aircraft.

The configuration interface 29 thus makes it possible to specify the category of vehicle so that the artificial horizon device 5 can weight the measured movement data accordingly.

Advantageously, the artificial horizon device 5 is suitable for generating the artificial horizon image on the basis of data relating to the individual as well. These data include, for example, one or more of the following items of information: age, morphology, visual abilities, and degree of susceptibility to motion sickness.

The effect of motion sickness is indeed variable from one individual to another due to the physical characteristics specific to each person. Thus, for an individual with a high degree of susceptibility, it is necessary for the artificial horizon image to represent the artificial horizon more markedly and to occupy a larger area of the visual field of the individual than for an individual whose degree of susceptibility to motion sickness is low.

Of course, the configuration interface 29 may include other functionalities and allow the artificial horizon device 5 to be turned on or off.

The memory 31 is configured for storing instructions of a computer program whose execution by the processor 37 results in the operation of the artificial horizon device 5.

In particular, the processor 37 may be configured, similarly to the processor 23 of the sensor 3, for detecting or determining a rotation of the vehicle on the basis of the movement data of the vehicle.

The wearable augmented reality device, hereinafter the wearable device 7, is suitable for displaying the artificial horizon image in real time to an individual who is wearing the wearable device and is a passenger of the vehicle. The wearable device 7 operates on the principle of augmented reality technology, namely the integration or superposition of virtual elements within a real environment. The artificial horizon image is thus combined with reality in the field of vision of the individual wearing the wearable device 7.

In other words, the wearable device 7 is suitable for embedding visual information about movement, manifesting in the form of an artificial horizon in the real image viewed by the individual. Thus, even when all elements present in the visual field of the individual are unmoving within the frame of reference of the vehicle and therefore unmoving relative to the individual, the artificial horizon image informs the individual's eyes of the movement of the vehicle. The obtained result is a better correlation between the information transmitted to the brain by the inner ear and the visual information collected by the individual's eyes.

The augmented reality device 7 comprises augmented reality glasses or an augmented reality helmet 41, possibly a motion sensor 43, a memory 47, and a processor 53.

The augmented reality glasses and the augmented reality helmet are configured for displaying the artificial horizon image, generated by the artificial horizon device 5, to the individual wearing the glasses or helmet in question. This type of device is widely known to those skilled in the art and allows superimposing a virtual image and a real image within the wearer's field of vision.

The motion sensor 43 is configured for measuring movement data relating to the head of the individual wearing the wearable device 7.

For example, the motion sensor 43 is suitable for measuring data on the movement of the individual's head within a three-dimensional frame of reference of the vehicle. Indeed, part of the motion sickness which the individual suffers from may also be due to movements of his/her head. Thus, in addition to the movement data for the vehicle, the system 2 may also provide, in one or more embodiments, for measuring the movement of the head of the individual wearing the wearable device 7.

In general, the operation of the motion sensor 43 is the same as that of sensor 3. Thus, the motion sensor 43 is configured for measuring an acceleration and an angular velocity of the individual's head within the three-dimensional frame of reference of the vehicle. To carry out such measurements, the motion sensor 43 may integrate one or more accelerometers and one or more gyroscopes for respectively measuring the acceleration and velocity in one or more directions of the three-dimensional frame of reference of the vehicle.

As explained above, the system 2 described herein is particularly suitable for an individual who is a passenger of a vehicle, whose visual attention is focused on elements or objects that are unmoving within the frame of reference of the vehicle. Indeed, in such a case, the visual information transmitted by the eyes of the individual is not movement information and is therefore in contradiction to the information transmitted to the brain by the inner ear.

Typically, the individual's attention is focused on the screen of a user terminal, such as a smart phone or digital tablet. Thus, in one or more embodiments, the system 2 takes into account the presence of a screen within the visual field of the individual, to generate the artificial horizon image.

Figure 2:
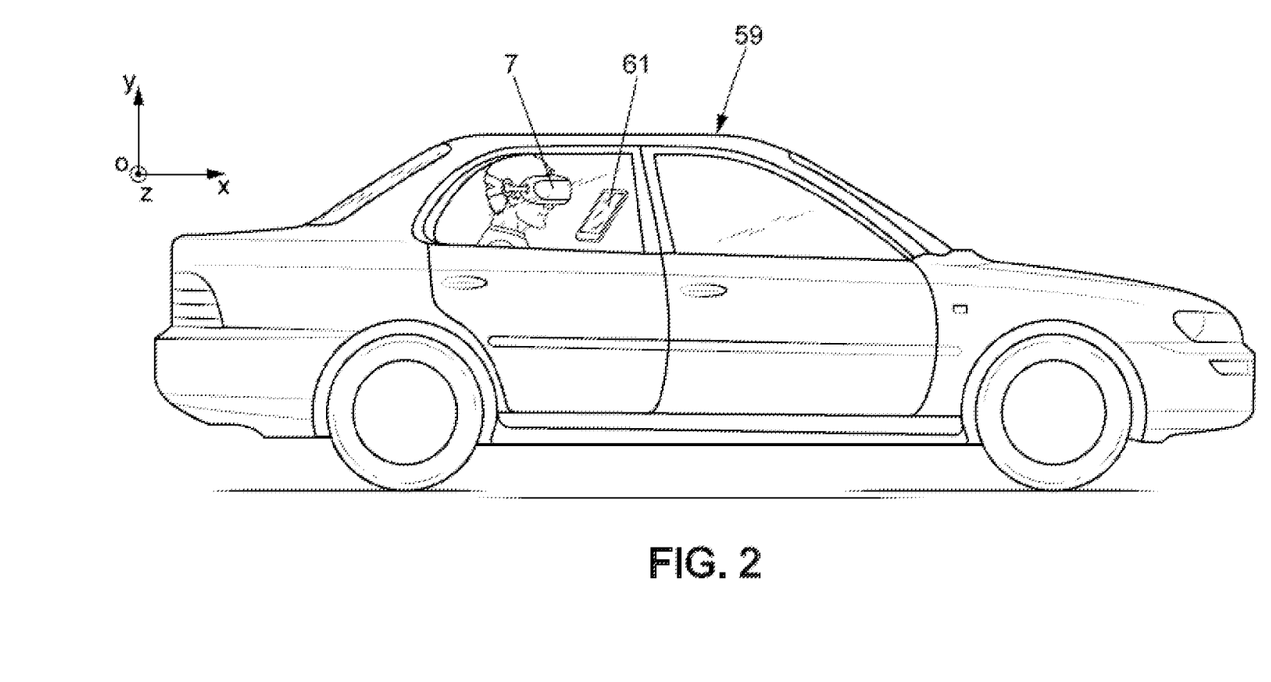
FIG. 2 illustrates an individual, in a vehicle, wearing a wearable augmented reality device of the visual assistance system of FIG. 1.

This particular case is illustrated in FIG. 2. The vehicle 59 considered here is an automobile. The individual is traveling in the automobile 59 and may suffer from motion sickness during the trip. This motion sickness is all the more probable when, as illustrated in FIG. 2, the individual's visual attention may be focused on a screen 61. The individual shown in this figure is wearing the wearable augmented reality device 7.

Also, in such a case, the wearable device 7 may further be suitable for measuring data on the position of the individual's head relative to the screen 61. The wearable device 7 is then also suitable for sending these data on the position of the individual's head to the artificial horizon device 5 so that said device can generate the artificial horizon image also on the basis of these data on the position of the individual's head relative to the screen 61 and, possibly, also on the basis of data relating to the screen 61.

The data relating to the screen 61 comprise for example data relating to the dimensions of the screen 61. This data relating to the screen 61 may also comprise data relating to a multimedia content displayed by the screen 61. These data may for example be supplied to the artificial horizon device 5 via the configuration interface 29.

Advantageously, the wearable device 7 is also suitable for detecting the presence of the screen 61 within the individual's field of vision. The wearable device 7 comprises an image capture and processing module which allows capturing an image and then detecting the presence of a screen in this image. Thus, when the screen 61 is detected within the visual field of the individual, information about the presence of the screen 61 is acquired by the wearable device 7 then sent to the artificial horizon device 5. The latter is then configured for taking into account the presence of the screen within the visual field of the individual, to generate the artificial horizon image. Details concerning the use of the screen 61, or more precisely of the image of the screen 61, will be given later on in the description.

The memory 47 is configured for storing instructions of a computer program whose execution by the processor 53 results in the operation of the wearable device 7.

Finally, the database 11 is configured for storing one or more vehicle routes. Within the database 11, each route is associated with one or more artificial horizon images.

This embodiment takes advantage of the fact that a vehicle may repeat the same routes, so it is advantageous to keep in the database 11 routes traveled and artificial horizon images generated by the artificial horizon device 5 during these routes.

Thus, during a route followed by the vehicle, the route followed is recorded and stored in the database 11. This route may in particular be characterized by the movement data measured along the route as well as by the geolocation data measured by the sensor 3.

At the same time, the artificial horizon images generated in real time along the route by the artificial horizon device 5 may be stored in the database 11. The artificial horizon images may also be stored in the memory 31 then stored in the database 11 only at the end of the route.

In the embodiment in which the system 2 comprises the database 11 described above, it is particularly advantageous for the artificial horizon device 5 to be suitable for detecting, during a current route, whether this route has already been taken and identified in the database 11.

The artificial horizon device 5 is then further suitable for determining a current route of the vehicle, on the basis of the movement data and the geolocation data of the vehicle, and comparing this current route with the route(s) stored in the database 11.

The artificial horizon device 5 is further suitable for:
- if the current route is already stored in the database 11, generating the artificial horizon image on the basis of the artificial horizon image(s) associated with the current route within the database 11,
- otherwise, storing in the database 11 the current route and the artificial horizon image(s) generated on the current route.

The advantage of such an embodiment is to be able to anticipate the movements of the vehicle and display the artificial horizon image to the individual sooner, which further limits the effects of motion sickness.

Figure 3:
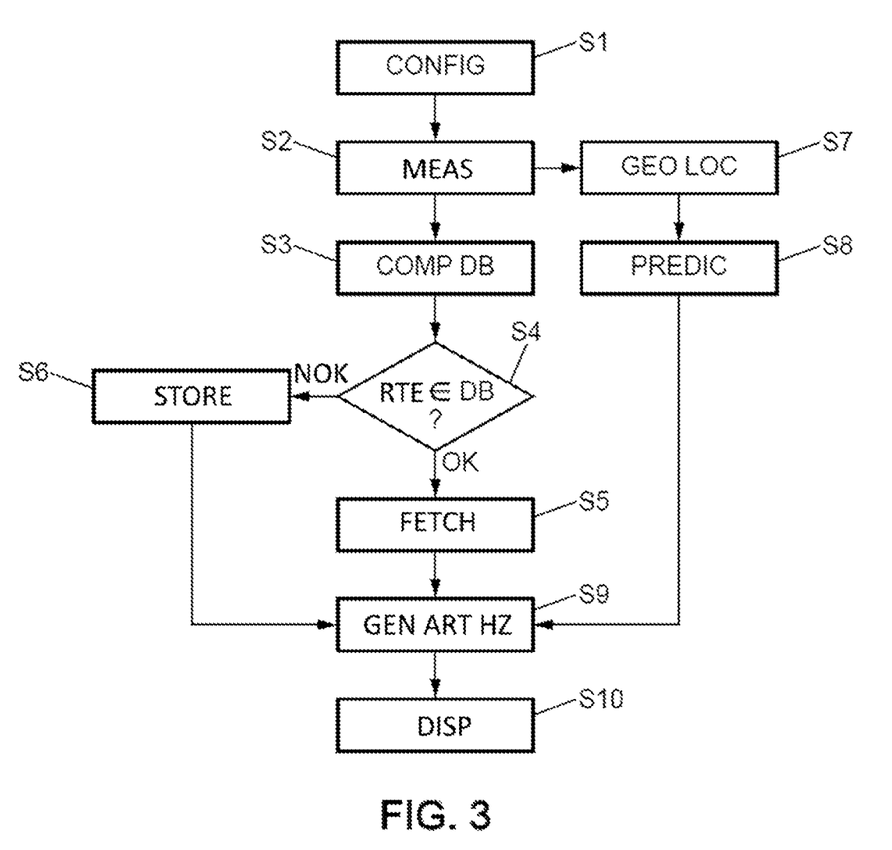
FIG. 3 illustrates a method for providing visual assistance to an individual suffering from motion sickness, according to the invention.

A method of providing visual assistance to an individual suffering from motion sickness will now be described with reference to FIG. 3.

In the context of implementing the method, an individual who may be subject to motion sickness is traveling in a vehicle. During the trip, the vehicle is moving relative to the actual horizon and this movement information, although collected by the inner ear and then transmitted to the brain, may not be detected by the individual's eyes which in such case are sending incorrect information to the brain. The contradiction between the visual information and the information provided by the inner ear is then the cause of the ailments described above and which constitute motion sickness.

In particular, this absence of visual information is often linked to the fact that nothing in the individual's visual field is indicating movement, which can occur in particular when the individual's visual attention is focused on elements or objects that are unmoving within the vehicle's frame of reference. For example, in the case illustrated in FIG. 2, the individual traveling in the automobile 59 may be focused on the screen 61 because he/she is viewing multimedia content such as a video. The system 2 described above then makes it possible to reduce the risks of motion sickness.

In a step S1, the artificial horizon device 5 of the system 2 is configured. This configuration is for example carried out via the configuration interface 29. This configuration step makes it possible, for example, to indicate the category of the vehicle to the artificial horizon device 5. The vehicle may thus be, without limitation, an automobile, a train, an aircraft, or a boat. The vehicle may also be a submarine.

In the example illustrated in FIG. 2, the vehicle 59 in which the individual is located is an automobile.

The information relating to the category of vehicle is particularly useful since the movements of the various vehicles are of different types. As explained above, an aircraft and a boat are mainly subject to rotations about the lateral axis, i.e. pitch, and about the longitudinal axis, i.e. roll. In contrast, an automobile is more likely to execute rotations about its vertical axis.

The specification of the category of vehicle during the configuration step thus allows, for example, appropriately weighting the various movements of the vehicle so that the artificial horizon device 5 gives an appropriate and weighted significance to each movement of the vehicle in a given direction.

The configuration of the artificial horizon device 5 may further make it possible to provide data relating to the individual comprising one or more of the following items of information: age, morphology, visual abilities, and degree of susceptibility to motion sickness.

During a step S2, the sensor 3 measures vehicle movement data. As explained above, the vehicle movement data comprise for example an acceleration of the vehicle within the three-dimensional terrestrial frame of reference and an angular velocity of the vehicle within the three-dimensional terrestrial frame of reference.

In the example illustrated in FIG. 2, a three-dimensional terrestrial frame of reference is represented. This frame of reference has a point O as its origin and comprises three orthogonal axes x, y, and z. Typically, if the sensor 3 is the one illustrated schematically in FIG. 1 and comprising three accelerometers 13A, 13B, 13C and three gyroscopes 17A, 17B, 17C, then:
- accelerometer 13A and gyroscope 17A respectively measure the acceleration and angular velocity in direction x;
- accelerometer 13B and gyroscope 17B respectively measure the acceleration and angular velocity in direction y; and
- accelerometer 13C and gyroscope 17C respectively measure the acceleration and angular velocity in direction z.

Furthermore, other measurements may be carried out during this step S2. For example, the sensor 3 may measure geolocation data of the vehicle. This data may be collected in real time. As explained above, the geolocation data may be determined by the sensor 3 via a server connected to a network or via a geolocation module integrated into the sensor 3.

Still during this step S2, the wearable device 7 may measure data on the movement of the individual's head within a three-dimensional frame of reference of the vehicle. Such a frame of reference is not illustrated in FIG. 2 but traditionally allows defining a vertical axis, a longitudinal axis, and a lateral axis. These axes are specific to the geometry of the vehicle and make it possible to characterize in particular the rotational movements of the vehicle, in particular yaw which corresponds to a rotation about the vertical axis, roll which corresponds to a rotation about the longitudinal axis, and pitch which corresponds to a rotation about the lateral axis. These same concepts can also be applied to the movements of the individual's head within the vehicle.

Among the other measurements made, the wearable device 7 may also measure the position of the individual's head in relation to a screen. Such measurements may be made in particular in the context of FIG. 2 in which the individual, who is a passenger of the vehicle 59, is likely to be looking at the screen 61 during the trip, for example in order to view multimedia content.

As explained above, certain embodiments of the invention also allow predictive generation of the artificial horizon image. A first embodiment is described below and corresponds to steps S3, S4, S5, and S6 of the method illustrated in FIG. 3. A second embodiment is also described below and corresponds to steps S7 and S8 of the method illustrated in FIG. 3. These embodiments may of course be implemented combined.

Concerning the first embodiment: during a step S3, the movement and geolocation data of the vehicle are correlated with the route(s) stored in the database 11. This correlation aims to determine whether the current route followed by the vehicle has already been listed in the database 11. Each route stored in the database 11 is referenced by a set of movement data and geolocation data of the vehicle, which allows the system 2 to compare the current route with stored routes, during step S3.

Thus, during a step S4, the system 2 determines whether or not the current route is stored in the database 11, on the basis of a comparison made between the current route, characterized by the movement and geolocation data of the vehicle, and the route(s) stored in the database 11.

During a step S5, implemented if the current route of the vehicle is already stored in the database 11, the artificial horizon image(s) within the database 11 associated with the corresponding route are fetched and sent to the artificial horizon device 5.

Otherwise, during a step S6 implemented if no route stored in the database 11 corresponds to the current route of the vehicle, the artificial horizon device 5 stores the current route in the database 11. The current route is stored in the database 11 with the vehicle movement and geolocation data obtained during step S2. Furthermore, the artificial horizon images generated by the artificial horizon device 5 during this current route will also be stored in the database 11, to be associated with the current route.

Concerning the second embodiment: during a step S7, the geolocation data of the vehicle are used to anticipate, for example using a map accessible to the system 2 via a network, the route followed by the vehicle.

During a step S8, the artificial horizon device 5 uses the upcoming route determined in the previous step to predict the future movements of the vehicle.

In the example illustrated in FIG. 2, the vehicle concerned is an automobile 59. Typically, the movement of the automobile 59 is constrained by the layout of the roads so that the movement of the automobile 59 follows the layout of the road on which it is located. Thus, the geolocation data of the automobile 59 make it possible to determine, via a map, the position of the automobile 59 and therefore the route followed by the automobile 59. It is thus possible, by using the layout of the route followed by the automobile 59, to predict the movements of the vehicle, in particular directional changes.

During a step S9, the artificial horizon device 5 generates an artificial horizon image in real time on the basis of the vehicle movement data. The artificial horizon image allows the individual to be visually informed of the movements of the vehicle in relation to the actual horizon.

For example, the artificial horizon image comprises an artificial horizon line.

Furthermore, other data may be taken into account for generating the artificial horizon image. As explained above, the artificial horizon device 5 may use information entered via the configuration interface 29, such as the category of the vehicle or data relating to the individual.

With reference to the two embodiments described above, the generation of the artificial horizon image may also be predictive, based on the artificial horizon images already generated for the same route and stored in the database 11 (first embodiment) or by using the upcoming layout of the route followed in order to anticipate the movements of the vehicle relative to the actual horizon and generate the artificial horizon image accordingly (second embodiment).

Moreover, in the case where the visual attention of the individual is focused on a screen, as in the example illustrated in FIG. 2, the actual screen image may also be used in order to generate a suitable artificial horizon image.

To this end, as explained above, the wearable device 7 may comprise an image capture and processing module so that, during implementation of the method, the wearable device 7 captures a real image in order to detect the presence or absence of a screen within this real image corresponding to the field of vision of the individual wearing the wearable device 7.

Also during the method, the wearable device 7 may determine data relating to the screen, namely its dimensions or the multimedia content displayed. These data relating to the screen are sent to the artificial horizon device 5 and are used, during step S9, to generate the artificial horizon image.

Thus, when the screen is detected within the individual's field of vision, the artificial horizon device 5 generates an artificial horizon image comprising a pattern representative of the artificial horizon and that can be superimposed on a portion of an edge of the screen.

Alternatively or in parallel, when the screen is detected within the individual's field of vision, the artificial horizon device generates an artificial horizon image comprising a pattern that can be superimposed on a portion of the screen in the form of tiling distorted according to the artificial horizon.

Finally, during a step S10, the augmented reality device 7 displays the artificial horizon image in real time to the individual who is wearing the wearable device 7 and is a passenger of the vehicle.

More precisely, the augmented reality glasses or the augmented reality helmet integrated into the wearable device 7 display(s) the artificial horizon image to the individual in a manner that superimposes the artificial horizon image on the real image, thus integrating the artificial horizon in real time within the field of vision of the individual who can thus visually perceive movements relative to the actual horizon.

Figure 4A:
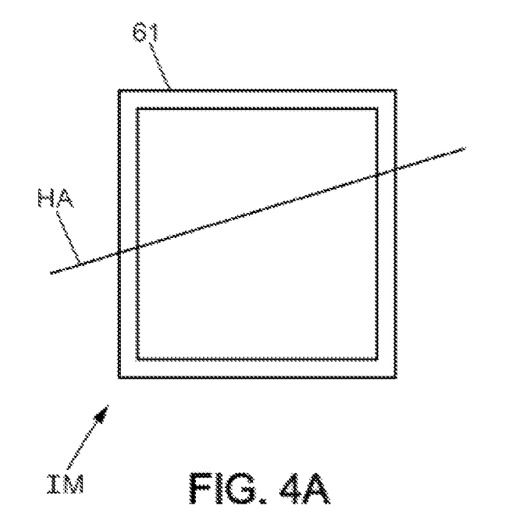
FIG. 4A illustrates an artificial horizon image, displayed by the wearable augmented reality device, in an embodiment in which the artificial horizon is displayed as an artificial horizon line.
Figure 4B:
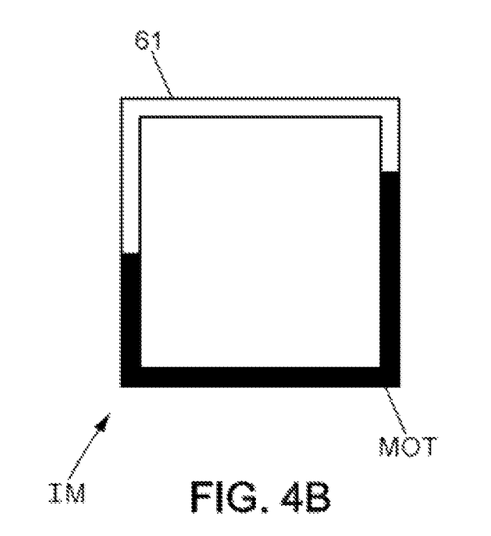
FIG. 4B illustrates an artificial horizon image in an embodiment in which the artificial horizon is displayed as a pattern superimposed on a portion of an edge of a screen within the individual's field of vision.
Figure 4C:
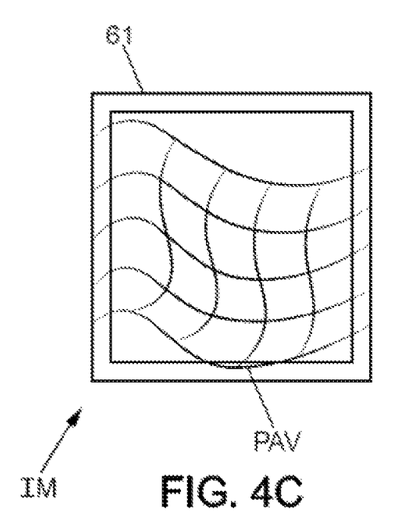
FIG. 4C illustrates an artificial horizon image in an embodiment in which the artificial horizon is displayed as distorted tiling superimposed onto a portion of the screen.

Combinations of artificial horizon images and real images, each forming an image IM viewed by the individual, are illustrated according to different embodiments in FIG. 4A, FIG. 4B, and FIG. 4C.

The screen 61 appears in each of these images, since each time concerns the case where the screen 61 is within the individual's field of vision, its presence being detected by the image capture and processing module of the wearable device 7.

In the example illustrated in FIG. 4A, the artificial horizon image takes the form of an artificial horizon line HA. This line physically indicates the position of the actual horizon, and its position in the artificial horizon image therefore follows the movements of the vehicle. It should be noted that, in this example, the artificial horizon device 5 does not make use of the presence of the screen within the individual's field of vision in order to generate the artificial horizon image.

In the example of FIG. 4B, this time the artificial horizon image makes use of the presence of the screen 61 within the individual's field of vision. Thus, the artificial horizon image comprises a pattern MOT that can be superimposed on a portion of an edge of the screen 61. The wearable device 7 superimposes this pattern, during step S10, on the corresponding portion of the edge of the screen 61. The advantage of such a pattern MOT is that it does not interfere with the viewing, by the individual, of the content displayed by the screen 61. In this example, the pattern MOT makes it possible to view an artificial horizon line which connects the extremities of the pattern MOT, respectively located on the side edges of the screen 61.

Finally, in the example of FIG. 4C, the artificial horizon image also uses the presence of the screen 61 within the individual's field of vision. The artificial horizon image comprises a pattern that can be superimposed on a portion of the screen 61 in the form of distorted tiling PAV. The distortion varies in real time to characterize the movements of the vehicle relative to the actual horizon. The tiling PAV shown in this figure corresponds to a grid and is superimposed on the screen 61.

The present invention offers several advantages.

First of all, the use of augmented reality makes it possible to visually inform an individual, who is a passenger of a vehicle, of the movements of the vehicle in question in relation to the actual horizon even when the visual attention of the individual is focused on elements or objects that are stationary within the vehicle's frame of reference.

Next, the use of geolocation to anticipate the route followed by the vehicle and therefore the upcoming movements allows rapid predictive generation of the artificial horizon image, which limits the lag between the artificial horizon as displayed to the individual via the artificial horizon image and the relative actual position of the vehicle, and therefore of the individual, with respect to the actual horizon.

Finally, the use of the presence of the screen within the individual's field of vision to superimpose the artificial horizon image on the real image, makes it possible to bring the movement information as close as possible to the visual attention of the individual, which is focused on the content displayed on the screen.

Although the present disclosure has been described with reference to one or more examples, workers skilled in the art will recognize that changes may be made in form and detail without departing from the scope of the disclosure and/or the appended claims.

The invention claimed is:

1. A system for providing visual assistance to an individual suffering from motion sickness, comprising:
   a sensor configured to measure movement data of a vehicle in real time within a three-dimensional terrestrial frame of reference,
   an artificial horizon device suitable for generating an image of an artificial horizon on a screen in real time on a basis of said movement data of the vehicle and on a basis of measured data on position of the individual's head relative to the screen, and
   a wearable augmented reality device suitable for displaying the artificial horizon image in real time to an individual who is wearing said wearable device and is a passenger of said vehicle.

2. The system according to claim 1, wherein the wearable augmented reality device comprises augmented reality glasses or an augmented reality helmet.

3. The system according to claim 1, wherein the artificial horizon device is suitable for generating the artificial horizon image also on a basis of a category of the vehicle, the artificial horizon device thus being configurable for one or more of the following categories of vehicles: automobile, train, aircraft, and boat.

4. The system according to claim 1, wherein the artificial horizon device is suitable for generating the artificial horizon image also on a basis of data relating to the individual, comprising one or more of the following items of information: age, morphology, visual abilities, and degree of susceptibility to motion sickness.

5. The system according to claim 1, wherein the sensor is further configured for collecting geolocation data of the vehicle, the artificial horizon device or the sensor being further suitable for predicting movement data of the vehicle on a basis of said geolocation data of the vehicle.

6. The system according to claim 1, comprising a database configured for storing one or more routes of the vehicle, each route being associated, within the database, with one or more artificial horizon image.

7. The system according to claim 6, wherein the sensor is further configured for collecting geolocation data of the vehicle and wherein the artificial horizon device is further suitable for determining a current route of the vehicle on the basis of the movement data and geolocation data of the vehicle, and comparing said current route with the one or more routes stored in the database, the artificial horizon device being further configured to:
   if the current route is already stored in the database, generate the artificial horizon image on the basis of the one or more artificial horizon image associated with said current route within the database,
   otherwise, store in the database the current route and the one or more artificial horizon image generated on said current route.

8. The system according to claim 1, wherein the sensor comprises:
   at least one accelerometer configured to measure data relating to an acceleration of the vehicle within the three-dimensional terrestrial frame of reference,
   at least one gyroscope configured to measure data relating to an angular velocity of the vehicle within the three-dimensional terrestrial frame of reference,
   the movement data of the vehicle comprising said data relating to the acceleration and angular velocity of the vehicle.

9. The system according to claim 1, wherein the sensor or the artificial horizon device is configured to determine, on the basis of the movement data of the vehicle, a rotation of said vehicle, the artificial horizon device being further configured to generate the artificial horizon image also on the basis of said rotation of the vehicle.

10. The system according to claim 1, wherein the sensor or the artificial horizon device is further configured to determine, on the basis of the movement data of the vehicle, an attitude of said vehicle, the artificial horizon device being further configured to generate the artificial horizon image also on the basis of said attitude of the vehicle.

11. The system according to claim 1, wherein the artificial horizon image comprises an artificial horizon line.

12. The system according to claim 1, wherein the wearable augmented reality device is further configured to measure data on the movement of the individual's head within a three-dimensional frame of reference of the vehicle, the artificial horizon device being configured to generate the artificial horizon image also on the basis of said data on the movement of the individual's head.

13. The system according to claim 1, wherein the wearable augmented reality device is further configured to measure the data on the position of the individual's head relative to the screen, the artificial horizon device being configured to generate the artificial horizon image also on the basis of said data on the position of the individual's head relative to the screen and on the basis of data relating to the screen.

14. The system according to claim 13, wherein the data relating to the screen comprise data relating to dimensions of the screen and/or data relating to a multimedia content displayed by said screen.

15. The system according to claim 13, wherein the wearable augmented reality device is further configured to detect a presence of said screen within the individual's field of vision.

16. The system according to claim 15, wherein the artificial horizon device is further configured to, when the screen is detected within the individual's field of vision, generate an artificial horizon image comprising a pattern representative of the artificial horizon and that can be superimposed on a portion of an edge of said screen, the wearable augmented reality device being configured to superimpose said pattern onto a real image of said portion of the edge of the screen.

17. The system according to claim 15, wherein the artificial horizon device is further configured to, when the screen is detected within the individual's field of vision, generate an artificial horizon image comprising a pattern that can be superimposed on a portion of the screen in the form of tiling distorted according to the artificial horizon, the wearable augmented reality device being configured to superimpose said pattern onto a real image of said portion of the screen.

18. A method for providing visual assistance to an individual suffering from motion sickness, comprising:
    measuring by a sensor, in real time, movement data of a vehicle within a three-dimensional terrestrial frame of reference,
    generating, on a screen, in real time an artificial horizon image by an artificial horizon device on a basis of:
        said movement data of the vehicle, and
        measured data on position of the individual's head relative to the screen, and
    displaying in real time the artificial horizon image by a wearable augmented reality device to the individual, who is wearing said wearable device and is a passenger of said vehicle.

19. A non-transitory readable medium storing instructions of a computer program, said computer program causing implementation of a method for providing visual assistance to an individual suffering from motion sickness, when said instructions are executed by at least one processor, the method comprising:
    measuring by a sensor, in real time, movement data of a vehicle within a three-dimensional terrestrial frame of reference, and
    generating, on a screen, in real time an artificial horizon image by an artificial horizon device on a basis of:
        said movement data of the vehicle, and
        measured data on position of the individual's head relative to the screen, and
    displaying in real time the artificial horizon image by a wearable augmented reality device to the individual, who is wearing said wearable device and is a passenger of said vehicle.

\* \* \* \* \*